Patented Nov. 25, 1924.

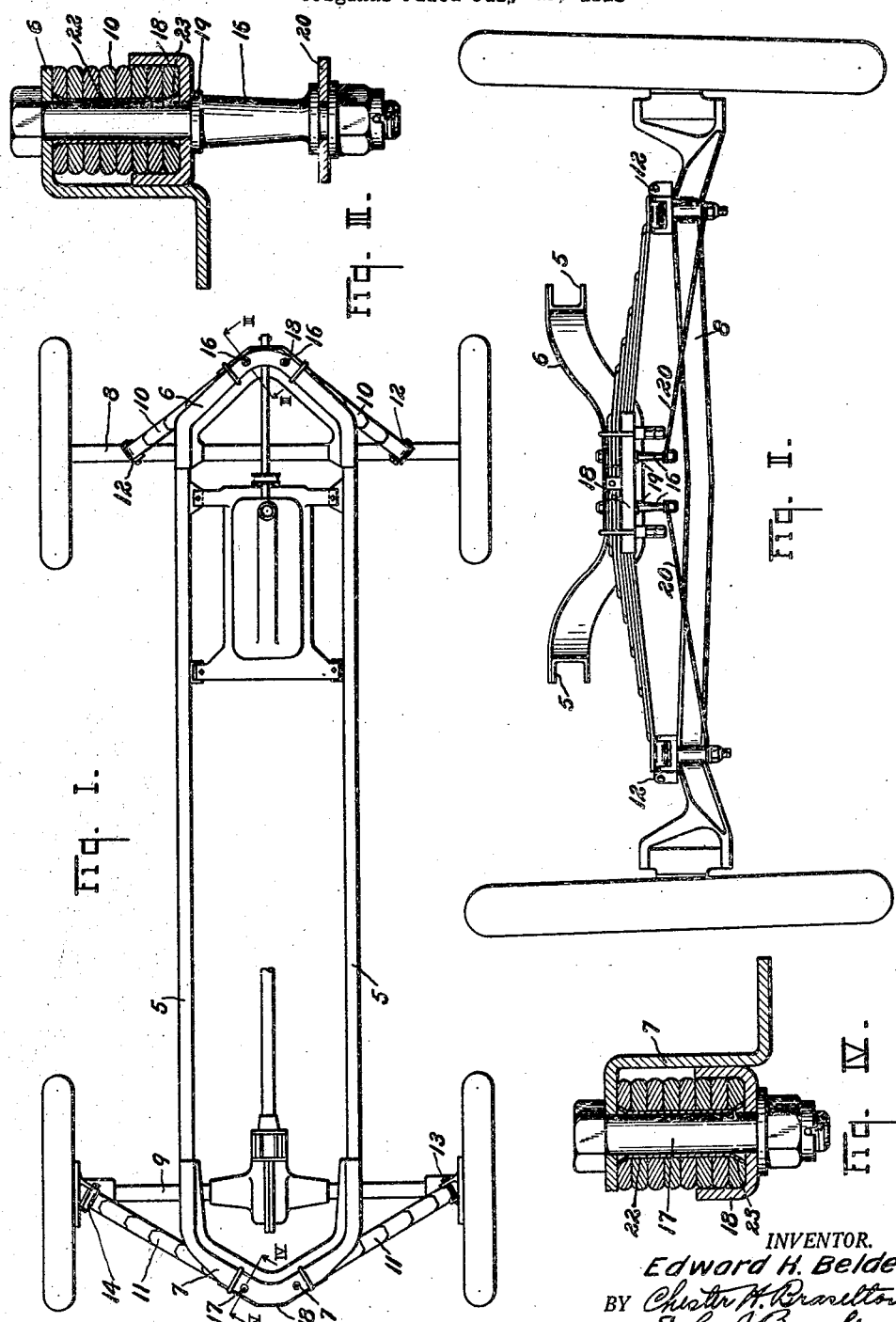

1,516,700

UNITED STATES PATENT OFFICE.

EDWARD H. BELDEN, OF TOLEDO, OHIO, ASSIGNOR TO THE WILLYS-OVERLAND COMPANY, OF TOLEDO, OHIO, A CORPORATION OF OHIO.

SPRING CONSTRUCTION.

Original application filed July 22, 1918, Serial No. 246,206. Divided and this application filed September 5, 1922. Serial No. 586,136.

*To all whom it may concern:*

Be it known that I, EDWARD H. BELDEN, a citizen of the United States, residing at Toledo, county of Lucas, State of Ohio, have invented certain new and useful Improvements in Spring Construction, of which I declare the following to be a full, clear, and exact description.

This invention relates to vehicle construction and is a division of my copending application 246,206 filed July 22, 1918. The invention has for its principal object a provision for facilitating the handling of built-up spring units and for expediting the assembly thereof with those parts of the vehicle chassis with which they cooperate. Other objects relating to details of construction will appear as I proceed with the description to follow:

In the accompanying drawing forming a part hereof, and illustrating a preferred embodiment of my invention, Figure I is a top plan view of an automobile chassis;

Fig. II is a front end view of the same, and

Figs. III and IV are cross sectional views drawn to a larger scale and taken respectively on lines III—III and IV—IV of Figure I.

Throughout the figures the same reference numerals refer to corresponding parts.

The chassis illustrated in Figs. I and II comprises two straight side frame members 5 joined at opposite ends by connecting members 6 and 7 of an approximate Z-shape cross section. The frame thus formed is supported from the front axle 8 and from the rear axle 9 by cantilever springs 10 and 11 respectively. The outer ends of springs 10 are pivotally connected to the axle 8 by yokes 12 and the outer end of one of the springs 11 is pivoted directly to the brake housing as at 13 while the outer end of the other spring 11 is pivotally mounted on the other brake housing by a shackle 14. The inner ends of the forward springs 10 are secured to the connecting member 6 by bolts 16 while the corresponding ends of the rear springs 11 are secured to the connecting member 7 by bolts 17. At both ends of the frame the springs are clamped between the upper flange of the Z-shaped connecting member and a channel 18, the bolt 16 at the front end being provided with a shoulder 19 to engage the channel 18 and having an extension beyond the same to support a brace 20. The securing bolts 16 and 17 for the springs pass through apertures in the individual leaves comprising each spring, the apertures being made sufficiently larger than the bolts to receive a sleeve 22. As indicated in Figs. III and IV, the opening in the top and the bottom leaf of each spring is tapered or flared to receive the flared ends of the sleeves 22, one end of each sleeve being preferably made with a flared or flanged end 23 while the opposite end is swaged over after the sleeve has been inserted in the openings in the various leaves comprising a unit. The leaves comprising a spring are thus maintained in proper position so that throughout the handling of the spring and in the assembly of the chassis the spring as a unit may be connected at one end to the axle and at the opposite end of the frame by passing the bolt 17 or 18 through the corresponding clamping sleeve.

Although I have shown and described my invention as applied to a vehicle spring of the cantilever type it is obvious that it is not limited to springs of that type but is equally applicable to all other styles of springs which are built up of a series of leaves.

While I have shown and described in detail a particular structural embodiment as illustrative of my invention, I do not wish to be limited thereby, since various changes might be made therein without departing from the spirit and scope of the invention covered by the appended claims.

Having thus described my invention, what I claim as new and desire to secure by Letters Patent is:

1. A leaf spring comprising a plurality of leaves each having an aperture therethrough adapted to receive a securing bolt, and a sleeve extending through said apertures, said sleeve firmly engaging the two outermost leaves to thereby bind all the leaves together.

2. A leaf spring comprising a plurality of leaves, each having an aperture therethrough at one end adapted to receive a securing bolt, and a sleeve extending through said apertures, the apertures in the two outermost leaves being flared outwardly and the ends of said sleeve being enlarged to engage therein, whereby the leaves of the spring are held in assembled relation.

3. In a leaf spring adapted for suspending a vehicle frame, a plurality of leaves, provided with aligned openings adapted to receive a bolt for securing said spring to a portion of said frame, and means also located in said aligned openings for retaining the several leaves of said spring in position before assembly to said frame.

4. In a leaf spring adapted for suspending a vehicle frame, a plurality of leaves, each provided with an opening adapted to receive a bolt for securing said spring to a portion of said frame, a sleeve extending through said openings and secured to each outer leaf of the spring to retain the leaves thereof in position.

5. In a leaf spring adapted for suspending a vehicle frame, a plurality of leaves, each provided with an opening adapted to receive a bolt for securing said spring to a portion of said frame, a sleeve extending through said openings and provided with turned over flanges bearing against each outer leaf of the spring to retain the leaves thereof in position.

In testimony whereof, I affix my signature.

EDWARD H. BELDEN.